United States Patent
Sugiura

(10) Patent No.: US 10,340,513 B2
(45) Date of Patent: Jul. 2, 2019

(54) POSITIVE ACTIVE MATERIAL FOR LITHIUM-ION SECONDARY BATTERY, POSITIVE ELECTRODE FOR LITHIUM-ION SECONDARY BATTERY, AND LITHIUM-ION SECONDARY BATTERY

(71) Applicant: TOYOTA JIDOSHA KABUSHIKI KAISHA, Toyota-shi, Aichi-ken (JP)

(72) Inventor: Ryuta Sugiura, Toyohashi (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 628 days.

(21) Appl. No.: 14/805,814

(22) Filed: Jul. 22, 2015

(65) Prior Publication Data

US 2016/0028080 A1 Jan. 28, 2016

(30) Foreign Application Priority Data

Jul. 22, 2014 (JP) .................................. 2014-149291

(51) Int. Cl.
*H01M 4/36* (2006.01)
*H01M 4/58* (2010.01)
(Continued)

(52) U.S. Cl.
CPC ........... *H01M 4/366* (2013.01); *H01M 4/485* (2013.01); *H01M 4/505* (2013.01); *H01M 4/525* (2013.01);
(Continued)

(58) Field of Classification Search
CPC ...... H01M 4/366; H01M 4/525; H01M 4/505; H01M 4/485; H01M 10/0525;
(Continued)

(56) References Cited

U.S. PATENT DOCUMENTS

2006/0057466 A1  3/2006 Suhara et al.
2007/0117014 A1* 5/2007 Saito .................... H01M 4/131
                                                   429/231.3
(Continued)

FOREIGN PATENT DOCUMENTS

CN   101542787 A   9/2009
CN   102210045 A  10/2011
(Continued)

OTHER PUBLICATIONS

Zheng et al. "Improved Electrochemical Performance of Li[Li0.2Mn0.54Ni0.13Co0.13]O2 cathode material by fluorine incorporation." Electrochimica Acta 105 (2013) 200-208 (Year: 2013).*
(Continued)

*Primary Examiner* — Michael L Dignan
(74) *Attorney, Agent, or Firm* — Sughrue Mion, PLLC

(57) ABSTRACT

A positive active material for a lithium-ion secondary battery includes a lithium composite oxide particle containing nickel atoms, manganese atoms, and fluorine atoms. The lithium composite oxide particle includes a particle center portion and a surface layer portion that is closer to a surface of the lithium composite oxide particle than the particle center portion is. A fluorine atom concentration Fc (at %) of the particle center portion measured by energy dispersive X-ray spectroscopy is lower than a fluorine atom concentration Fs (at %) of the surface layer portion.

12 Claims, 2 Drawing Sheets

(51) Int. Cl.
  H01M 10/0525    (2010.01)
  H01M 4/485      (2010.01)
  H01M 4/505      (2010.01)
  H01M 4/525      (2010.01)
  H01M 10/052     (2010.01)
(52) U.S. Cl.
  CPC ....... *H01M 4/582* (2013.01); *H01M 10/0525* (2013.01); *H01M 10/052* (2013.01); *H01M 2220/20* (2013.01); *Y02E 60/122* (2013.01)
(58) Field of Classification Search
  CPC ............... H01M 4/582; H01M 10/052; H01M 2220/20; Y02E 60/122
  See application file for complete search history.

(56) References Cited

U.S. PATENT DOCUMENTS

| | | | |
|---|---|---|---|
| 2007/0264573 A1* | 11/2007 | Yamada | C01G 45/1228 429/231.1 |
| 2008/0157027 A1 | 7/2008 | Manthiram et al. | |
| 2009/0123842 A1* | 5/2009 | Thackeray | C01G 45/1221 429/224 |
| 2011/0217574 A1 | 9/2011 | Toyama et al. | |
| 2012/0034516 A1* | 2/2012 | Koo | C01G 45/1228 429/200 |
| 2012/0315544 A1 | 12/2012 | Yasuda et al. | |
| 2015/0089797 A1* | 4/2015 | Binder | C01G 45/1242 29/623.1 |
| 2015/0287984 A1* | 10/2015 | Kong | H01M 4/1315 429/223 |

FOREIGN PATENT DOCUMENTS

| | | |
|---|---|---|
| CN | 102403494 A | 4/2012 |
| CN | 102791633 A | 11/2012 |
| JP | 2000149925 A | 5/2000 |
| JP | 2000203843 A | 7/2000 |
| JP | 2002184402 A | 6/2002 |
| JP | 2006202678 A | 8/2006 |
| JP | 2011187193 A | 9/2011 |
| JP | 2012181975 A | 9/2012 |
| KR | 1020100042145 A | 4/2010 |
| KR | 1020130014241 A | 2/2013 |
| WO | 2005/028371 A1 | 3/2005 |
| WO | 2011111364 A1 | 9/2011 |
| WO | 2013149716 A1 | 10/2013 |

OTHER PUBLICATIONS

Yang et al. "Fluorine-doped LiNi0.5Mn1.5O4 for 5 V cathode materials of lithium-ion battery." Materials Research Bulletin 43 (2008) 3607-3613 (Year: 2008).*

Guodong Du et al., "Short communication: Fluorine-doped LiNi$_{0.5}$Mn$_{1.5}$O$_4$ for 5 V cathode materials of lithium-ion battery", Materials Research Bulletin 43 (2008) 3607-3613.

S. H. Park et al. "Lithium-manganese-nickel-oxide electrodes with integrated layered-spinal structures for lithium batteries" Electrochemistry Communications vol. 9, 2007; (pp. 262-268).

* cited by examiner

POSITIVE ACTIVE MATERIAL FOR LITHIUM-ION SECONDARY BATTERY, POSITIVE ELECTRODE FOR LITHIUM-ION SECONDARY BATTERY, AND LITHIUM-ION SECONDARY BATTERY

INCORPORATION BY REFERENCE

The disclosure of Japanese Patent Application No. 2014-149291 filed on Jul. 22, 2014 including the specification, drawings and abstract is incorporated herein by reference in its entirety.

BACKGROUND OF THE INVENTION

1. Field of the Invention

The present invention relates to a positive active material for a lithium-ion secondary battery, a positive electrode for a lithium-ion secondary battery, and a lithium-ion secondary battery.

2. Description of Related Art

As a positive active material capable of providing a high energy density of a lithium-ion secondary battery, a spinel lithium nickel manganese composite oxide having an operating potential of 4.5 V or higher on the basis of metal lithium (hereinafter, a potential based on metal lithium may be represented by "vs.Li/Li$^+$") is known. However, in the battery using the composite oxide as the positive active material, for example, when charging and discharging are repeated under the condition of a positive electrode potential of 4.5 V (vs.Li/Li$^+$) or higher, metal elements (typically manganese) elute from the positive active material, and the durability thereof may be significantly degraded. As a technique for a countermeasure to this problem, for example, in Materials Research Bulletin, 2008, Volume 43, Issue 12, Pages 3607-3613, enhancing durability by substituting a portion of oxygen (O) atoms in the lithium nickel manganese composite oxide with fluorine (F) atoms is described.

In a case of applying the technique to a battery in which both of a high energy density and a high output density are required (for example, an in-vehicle battery), there is still room for improvement. In a battery having a lithium nickel manganese composite oxide in which a portion of oxygen atoms is replaced with fluorine atoms, binding of the anions (O, F) and the cations (Ni, Mn) of the lithium nickel manganese composite oxide is increased due to the fluorine, and thus elution of metal elements from the composite oxide can be suppressed. This results in a tendency to increase durability. However, in a case where the amount of fluorine is small, when charging and discharging are repeated under severe conditions (for example, under the conditions of charging until the potential of the positive electrode reaches 4.5 V (vs.Li/Li$^+$) in an environment at a high temperature of 50° C. or higher), the effect of enhancing durability cannot be sufficiently obtained, and a non-aqueous electrolyte at the positive electrode is oxidized and decomposed, resulting in an increase in the amount of generated gas. On the other hand, when the amount of fluorine is increased in consideration of the enhancement of durability and a reduction in the amount of generated gas, the interaction between the fluorine and a charge carrier (Li ions) is increased, and thus the diffusibility (mobility) of Li ions in the composite oxide is degraded. As a result, the battery resistance is increased, and particularly, input and output characteristics are degraded during high-rate charging or discharging. That is, although the increase in the amount of fluorine enhances durability or reduces the gas generation amount, there is a contradiction that the battery resistance is increased.

SUMMARY OF THE INVENTION

The present invention provides a positive active material for a lithium-ion secondary battery, a positive electrode for a lithium-ion secondary battery, and a lithium-ion secondary battery.

A first aspect of the present invention is a positive active material for a lithium-ion secondary battery. The positive active material includes a lithium composite oxide particle containing nickel atoms, manganese atoms, and fluorine atoms. The lithium composite oxide particle includes a particle center portion and a surface layer portion that is closer to a surface of the lithium composite oxide particle than the particle center portion is. A fluorine atom concentration Fc (at %) of the particle center portion measured by energy dispersive X-ray spectroscopy is lower than a fluorine atom concentration Fs (at %) of the surface layer portion.

By relatively reducing the fluorine atom concentration Fc of the particle center portion, Li diffusibility in the particle can be ensured, and thus an increase in resistance can be suppressed. In addition, by relatively increasing the fluorine atom concentration Fs of the surface layer portion which is closer to the surface than the particle center portion is, elution of metal elements (typically manganese) from the lithium nickel manganese composite oxide or the oxidative decomposition of the non-aqueous electrolyte can be suppressed. Therefore, according to the positive active material in the first aspect of the present invention, the fluorine atoms contained in the positive electrode efficiently suppresses the elution of metal elements or the oxidative decomposition of the non-aqueous electrolyte. Thus, a lithium-ion secondary battery having both high durability and excellent input and output characteristics can be obtained.

In the first aspect of the present invention, a portion of oxygen atoms in the lithium composite oxide particle may be substituted with the fluorine atoms.

In the first aspect of the present invention, the Fc may be 0 at % or higher and 10 at % or lower. According to this configuration, high durability and excellent input and output characteristics can be compatible with each other at a higher level.

In the above configuration, the fluorine atoms may be present in the particle center portion in a proportion of 10 at % or lower. According to this configuration, high durability and excellent input and output characteristics can be compatible with each other at a higher level.

In the first aspect of the present invention, the Fs may be 30 at % or higher. According to this configuration, high durability and excellent input and output characteristics can be compatible with each other at a higher level.

In the first aspect of the present invention, a difference obtained by subtracting the Fc from the Fs may be 20 at % or greater. According to this configuration, high durability and excellent input and output characteristics can be compatible with each other at a higher level.

In the first aspect of the present invention, at least one of a portion of the nickel atoms and a portion of the manganese atoms may be substituted with iron atoms. In addition, at least one of a portion of the nickel atoms and a portion of the manganese atoms may be substituted with titanium atoms. According to this configuration, the structural stability of the fluorine-containing lithium nickel manganese composite oxide can be further increased. As a result, higher durability (for example, high-temperature cycle characteristics) or input and output characteristics can be obtained.

In the first aspect of the present invention, the particle center portion may be a region extending, toward a center of the lithium composite oxide particle, from a position of 100 nm or greater inward from the surface of the lithium composite oxide particle.

In the above configuration, the surface layer portion may be a region of 20 nm or smaller from the surface toward the center.

In the first aspect of the present invention, the particle center portion may be a portion of the lithium composite oxide particle containing no fluorine atoms and extending from a center of the lithium composite oxide particle toward the surface of the lithium composite oxide particle. In addition, the surface layer portion may be a portion of the lithium composite oxide particle containing the fluorine atoms and extending from the surface toward the center.

The second aspect of the present invention is a positive electrode for a lithium-ion secondary battery including the positive active material according to the first aspect of the present invention.

The third aspect of the present invention is a lithium-ion secondary battery including the positive electrode according to the second aspect of the present invention.

The lithium-ion secondary battery in the third aspect of the present invention has both excellent initial characteristics and durability. For example, the lithium-ion secondary battery has a high energy density and a low resistance, and a reduction in the battery capacity is less likely to occur even when high-rate charging and discharging are repeated over a long period of time. Therefore, the lithium-ion secondary battery in the third aspect of the present invention can be appropriately used as a power source (high-output drive electric power source) for driving a motor mounted in a vehicle such as a plug-in hybrid vehicle, a hybrid vehicle, and an electric vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
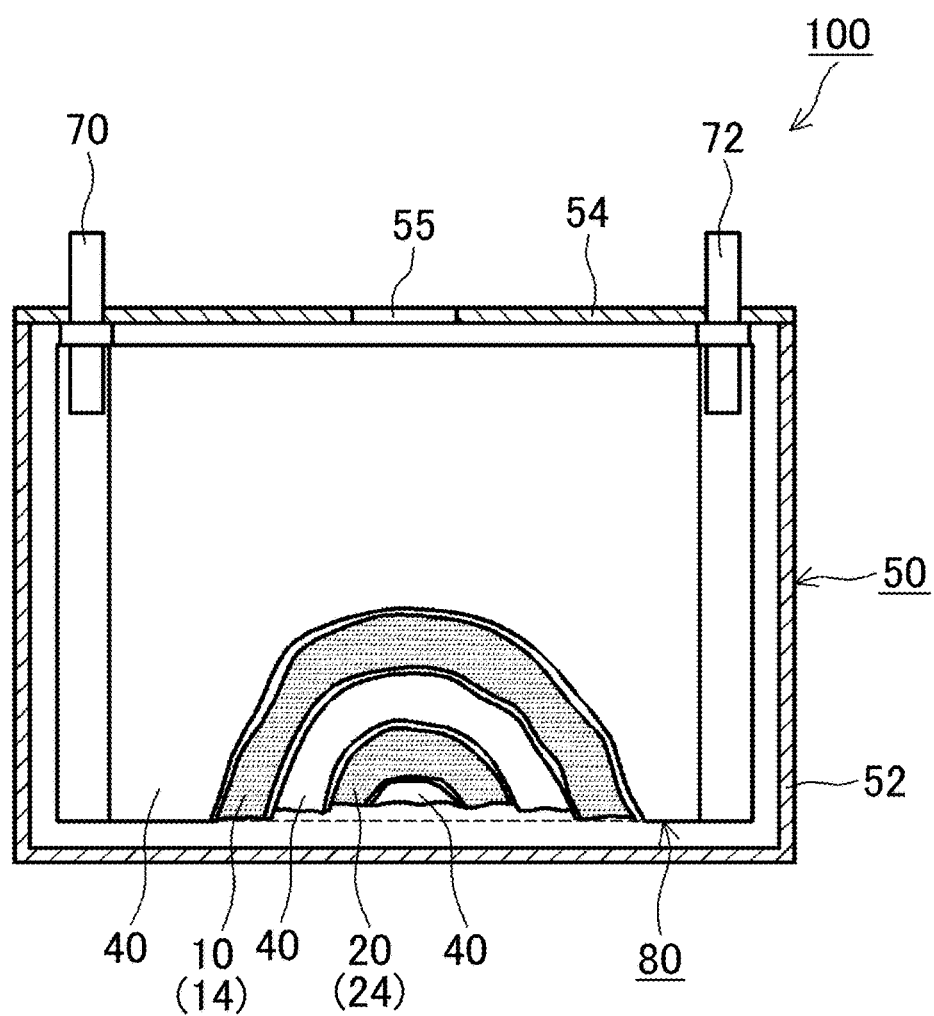
FIG. 1 is a longitudinal sectional view schematically illustrating a lithium-ion secondary battery according to an embodiment of the present invention.

Hereinafter, exemplary embodiments of the present invention will be described. In addition, items which are not the items (for example, the configuration of a positive active material) that are particularly mentioned in the specification and are necessary items (for example, other battery constituent elements that do not characterize the present invention, a general manufacturing process of the battery, and the like) for the implementation of the present invention can be recognized as design items of the skilled based on the related art in a corresponding field. The present invention can be implemented on the basis of the contents disclosed in the specification and general technical knowledge in the corresponding field.

In the specification, a "particle center portion" is a region including the center of a particle and the vicinity thereof. Typically, the particle center portion refers to a region of about 100 nm or greater inward from the outermost surface of the particle toward the center. As an example, in a case where the particle is substantially spherical, the minimum circle that circumscribes the particle is drawn, and a region of 200 nm or shorter from the center portion thereof, for example, 100 nm or shorter (the inner portion of a circle having a radius of 200 nm (a radius of 100 nm) from the center of the circumscribed circle) may be regarded as the particle center portion. In the specification, a "surface layer portion" refers to a region of 20 nm or smaller from the outermost surface of a particle toward the center thereof.

The magnitude of a fluorine atom concentration at the particle center portion or the surface layer portion can be checked as below, for example, by energy dispersive X-ray spectroscopy (EDX) using a general transmission electron microscope (TEM). First, a measuring object is prepared by embedding an arbitrary fluorine-containing lithium nickel manganese composite oxide particle in an appropriate resin and then subjecting the resultant to cross-section polishing to expose the cross-section of the particle. In this application, the "fluorine-containing lithium nickel manganese composite oxide particle" may be regarded as a lithium composite oxide particle containing nickel atoms, manganese atoms, and fluorine atoms. Next, the cross-section is observed through TEM at an appropriate magnification. In the obtained TEM observation image, a particle center portion and a surface layer portion are analyzed through EDX to obtain the fluorine atom concentrations (at %) thereof. Through EDX, atoms from boron (B) with an atomic number 5 to uranium (U) with an atomic number 92 can be detected. Therefore, using an EDX technique, the ratio of fluorine atoms (fluorine atom concentration (at %)) when the sum of atoms that belong to atomic numbers 5 to 92 among the constituent atoms (typically, the sum of constituent atoms excluding lithium) is 100 at % can be calculated. By comparing the obtained fluorine atom concentrations, the magnitudes of the fluorine atom concentrations of the particle center portion and the surface layer portion can be recognized. More appropriately, line analysis may be performed through EDX on a straight line from an arbitrary point positioned at the outermost surface of a particle toward the center. By the line analysis, a change in the fluorine atom concentration from the surface to the center of the particle can be accurately recognized. Otherwise, the magnitude relationship between the fluorine atom concentrations can be generally recognized more simply, for example, by comparing the counts per second (CPS) of fluorine (that is, the amount of fluorine atoms being present) in the same visual field of the TEM observation image.

A positive active material of an embodiment of the present invention contains a particulate fluorine-containing lithium nickel manganese composite oxide (hereinafter, may also be referred to as an "F—NiMn oxide particle"). The lithium nickel manganese composite oxide may also be an oxide recognized as a so-called spinel nickel manganese composite oxide (NiMn spinel) in which a portion of a manganese site of an oxide expressed by a general formula $LiMn_2O_4$ is substituted with nickel. The F—NiMn oxide contains at least lithium, nickel, manganese, oxygen, and fluorine and may be an oxide in which a portion of oxygen atoms in the lithium nickel manganese composite oxide is replaced with fluorine atoms. By using the composite oxide as the positive active material, the operating voltage of a lithium-ion secondary battery can be set to 4.5 V or higher (for example, so-called 5 V class), and thus a high energy density can be obtained.

In the embodiment of the present invention, the concentration of fluorine atoms varies between the center portion of the F—NiMn oxide particle and the surface layer portion thereof which is closer to the surface than the particle center portion is. Specifically, the fluorine atom concentration Fc (at %) at the particle center portion and the fluorine atom concentration Fs (at %) at the surface layer portion have a relationship of Fc<Fs. For example, the fluorine atom concentration decreases from the outermost surface toward the center of the particle in an inclined or stepwise manner. By relatively increasing the fluorine atom concentration Fs of the surface layer portion that comes into contact with a non-aqueous electrolyte, the binding energy of anions (O, F) and cations (Ni, Mn) at the surface layer portion can be increased. Therefore, elution of metal elements (typically manganese) from the F—NiMn oxide particle can be suppressed to a high degree. Moreover, oxygen deficiency at the surface layer portion can be compensated by fluorine, and thus the oxidative decomposition of the non-aqueous electrolyte can be suppressed. Therefore, the amount of gas generated during ordinary use can be reduced. In addition, by relatively reducing the fluorine atom concentration Fc of the particle center portion, the interaction between fluorine and lithium ions at the particle center portion is less likely to occur. Accordingly, Li diffusibility in the particle can be ensured, and thus an increase in resistance can be suppressed.

The fluorine atom concentration Fs at the surface layer portion is not particularly limited as long as it is higher than the fluorine atom concentration Fc at the particle center portion. However, in order to exhibit the effect of the present invention at a higher level, the fluorine atom concentration Fs may be generally 1 at % or higher, typically 1.5 at % or higher, typically 10 at % or higher, and for example, 20 at % or higher or 30 at % or higher. When the fluorine atom concentration Fs is too high, there is a tendency to reduce the energy density. Therefore, from this point of view, the fluorine atom concentration Fs is typically 50 at % or lower, and preferably 40 at % or lower.

The fluorine atom concentration Fc at the particle center portion is not particularly limited as long as it is lower than the fluorine atom concentration Fc at the surface layer portion. For example, the particle center portion may contain fluorine or may not contain fluorine. More specifically, the fluorine atom concentration Fc is 0 at % or higher, preferably higher than 0%, more preferably 0.5 at % or higher, and typically 1 at % or higher, and for example, may be 5 at % or higher. According to the new findings of the inventors, by allowing the particle center portion to contain fluorine, elution of metal elements (typically manganese) from the F—NiMn oxide particle can be accurately suppressed, for example, even in an aspect in which charging and discharging are repeated under severe conditions (for example, an aspect in which a high-rate charging and discharging cycle is repeated in an environment at a high temperature of about 60° C.). In addition, the fluorine atom concentration Fc may be typically 20 at % or lower, and preferably 10 at % or lower. By minimizing the amount of fluorine atoms at the particle center portion, the diffusibility of lithium ions can be maintained at a high level, and thus the effect of the present invention can be exhibited at a higher level.

The difference (Fs−Fc) between the fluorine atom concentration Fs at the surface layer portion and the fluorine atom concentration Fc at the particle center portion is not particularly limited, and may be typically 1 at % or greater, for example, 2 at % or greater, typically 5 at % or greater, preferably 10 at % or greater, and more preferably 20 at % or greater. Otherwise, the ratio (Fc/Fs) of the Fs to the Fc may be, for example, 2 or higher, and preferably 3 or higher. By increasing the difference in the fluorine atom concentration between the surface layer portion and the center portion, fluorine atoms at the surface layer portion are significantly maldistributed, and thus the effect of the present invention can be exhibited at a higher level. On the other hand, from the viewpoint of manufacturability (replaceability), the difference (Fs−Fc) may be generally 50 at % or smaller, typically 40 at % or smaller, and for example, 30 at % or smaller.

Appropriate examples of the F—NiMn oxide include oxides expressed by the following general formula (I).

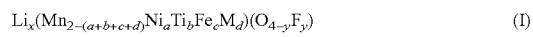

$$Li_x(Mn_{2-(a+b+c+d)}Ni_aTi_bFe_cM_d)(O_{4-y}F_y) \quad (I)$$

In the formula (I), a, b, c, and d are real numbers that satisfy 0<a (for example, 0.4<a<0.6), 0≤b (for example, 0≤b<0.2), 0≤c (for example, 0≤c<0.2), and 0≤d (for example, 0≤d<0.2). In addition, x and y are real numbers that respectively satisfy 0.9<x<1.3 (for example, 0.9<x≤1.2), 0<y<4 (typically 0<y<1, for example, 0.05≤y≤0.2, and technically speaking 0<y<0.1). That is, the a represents the Ni content in the F—NiMn oxide, and more preferably satisfies 0.4<a<0.6, and even more preferably satisfies a≤0.5. The b represents the Ti content, and from the viewpoint of maintaining high electron conductivity, preferably satisfies 0.01≤b, and preferably satisfies b≤0.15. The c represents the Fe content, and from the viewpoint of maintaining high battery capacity, preferably satisfies 0.01≤c, and preferably satisfies c≤0.1. The d represents the content of an arbitrary M element, and from the viewpoint of reducing resistance, preferably satisfies d≤0.07, and preferably satisfies d≤0.05.

In addition, when 0<d is satisfied, M may be a transition metal element or a typical metal element such as aluminum (Al), magnesium (Mg), calcium (Ca), barium (Ba), strontium (Sr), scandium (Sc), vanadium (V), chromium (Cr), cobalt (Co), copper (Cu), zinc (Zn), gallium (Ga), yttrium (Y), ruthenium (Ru), rhodium (Rh), lead (Pd), indium (In), tin (Sn), antimony (Sb), lanthanum (La), cerium (Ce), samarium (Sm), zirconium (Zr), niobium (Nb), tantalum (Ta), molybdenum (Mo), and tungsten (W). Otherwise, M may also be a metalloid element such as boron (B), carbon (C), silicon (Si), and phosphorus (P) or a non-metallic element such as sulfur (S). One or two or more of such substitutive elements may be employed without particular limitations.

As an example of the oxide expressed by the general formula (I), a composite oxide which satisfies 0<b and/or 0<c, that is, contains at least Ti and/or Fe that replaces a portion of a cation site (Ni and Mn) may be employed. For example, a fluorine-containing lithium nickel manganese titanium composite oxide (F—LiNiFeMnTi composite oxide) which satisfies 0<b and 0<c, that is, contains Ti and Fe that replace a portion of a cation site (Ni and Mn) may be employed. By replacing Ni and/or Mn with heterogeneous elements, higher structural stability can be obtained, for example, even in an environment at a high temperature of about 50° C. to 70° C. As a result, even in a case where charging and discharging are repeated under severe conditions (for example, under the conditions of charging until the potential of the positive electrode reaches 4.5 V (vs.Li/Li⁺) in a high-temperature environment), a reduction in capacity and the amount of generated gas can be suppressed to a low level. In addition, as another example of the M element, a composite oxide containing transition metal elements other than Li, Ni, and Mn, for example, a fluorine-containing lithium nickel iron manganese titanium cobalt composite oxide (F—LiNiFeMnTiCo composite oxide) containing Co as the M element may be employed. More specifically, for example, $LiNi_{0.45}Fe_{0.05}Mn_{1.45}Ti_{0.05}O_{3.95}F_{0.05}$ or $LiNi_{0.42}Fe_{0.05}Mn_{1.45}Ti_{0.05}Co_{0.03}O_{3.95}F_{0.05}$ may be employed.

Such an F—NiMn oxide particle typically has a spinel crystal structure (spinel crystal phase). In addition, for example, the F—NiMn oxide particle may contain an F—NiMn oxide phase having the spinel crystal structure as a primary phase and a second oxide phase in an inseparable state. The ratio of the second oxide phase is typically lower than the ratio of the spinel crystal phase. For example, when the sum of the spinel crystal phase and the second oxide phase is 100 mol %, the ratio of the second oxide phase may be 10 mol % or lower, preferably 3 mol % to 8 mol %, and for example, may be 5±1 mol %.

In an appropriate aspect, as the second oxide phase, an oxide phase having a layered rock salt crystal structure (layered crystal phase) and is formed of a composite oxide of lithium and transition metals is included. At this time, at least a portion of the interface between the spinel crystal phase and the layered crystal phase may be in a state in which the oxygen surfaces of the crystal structures match each other. According to the aspect, elution of transition metal elements (for example, manganese) from the spinel crystal phase can be more appropriately suppressed. In addition, when charging and discharging are performed until the potential of the positive electrode reaches 4.5 V (vs.Li/Li⁺) or higher, lithium in the layered crystal phase is activated and separated, and thus the amount of usable lithium atoms is increased. Therefore, a reduction in capacity can be suppressed to a high degree. As an appropriate example of the second oxide phase, a so-called lithium-rich oxide expressed by, for example, a general formula $Li_2MnO_3$ may be employed. More specifically, an oxide expressed by, for example, the following general formula (II) may be employed.

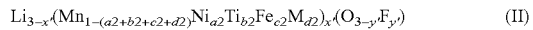
$$Li_{3-x'}(Mn_{1-(a2+b2+c2+d2)}Ni_{a2}Ti_{b2}Fe_{c2}M_{d2})_{x'}(O_{3-y'}F_{y'}) \quad (II)$$

Here, in the formula (II), a2, b2, c2, and d2 are real numbers that satisfy 0≤a (for example, 0≤a2≤0.2), 0≤b2 (for example, 0≤b2≤0.3), 0≤c2 (for example, 0≤c2≤0.2), 0≤d2 (for example, 0≤d2≤0.2), and a2+b2+c2+d2≠0. In addition, x' and y' are real numbers that respectively satisfy 1≤x'≤1.5, 0<y'<3 (typically 0<y'<1, for example, 0<y'<0.5, and technically speaking 0<y'<0.1). In addition, when 0<d is satisfied, M is obtained in the same manner as in the general formula (I).

The average particle diameter of F—NiMn oxide particles constituting the F—NiMn oxide may be generally 0.01 μm or greater, typically 0.1 μm or greater, and for example, 1 μm or greater in consideration of handleability or workability during the manufacturing of the positive electrode. In addition, from the viewpoint of the homogeneous formation of a positive active material layer, the average particle diameter thereof may be generally 30 μm or smaller, typically 20 μm or smaller, and for example, 10 μm or smaller. In the specification, an "average particle diameter" means a particle diameter ($D_{50}$, also called a median diameter) corresponding to 50 vol. % of a cumulative frequency on the fine particle side with a small particle diameter in a particle size distribution in terms of volume based on a general laser diffraction/scattering method. The shape of the F—NiMn oxide particle is not particularly limited, and an appropriate example thereof is a substantially spherical shape. Here, "substantially spherical shape" is a term that includes a spherical shape, a prolate spheroid shape, a polyhedral shape, and the like, and indicates, for example, a shape having an average aspect ratio (the ratio of the length in a major axis direction to the length in a minor axis direction in a smallest rectangle that circumscribes a particle) of 1 to 2 (typically 1 to 1.5, for example, 1 to 1.2).

Hereinafter, a method of manufacturing the F—NiMn oxide particle in which the fluorine atom concentration varies between the center portion and the surface layer portion in the particle will be described.

As an appropriate aspect, a manufacturing method including a process of preparing a raw material hydroxide (precursor) and a baking process may be employed. Specifically, first, the supply sources (raw material) of metal elements excluding Li, which are selected depending on a target composition are weighed to achieve a predetermined composition ratio, and the weighed resultant is mixed with an aqueous solvent, thereby preparing an aqueous solution. As the supply sources of the metal elements excluding Li, at least manganese salt and nickel salt are used, and other metal salts (for example, titanium salt and iron salt) may further be used depending on a target composition. Anions for the metal salts may be selected so that the salts have desired water solubility. For example, sulfate ions, nitrate ions, chloride ions, carbonate ions, and the like may be selected. The anions for the metal salts may be the same or portions thereof may be the same. Otherwise, the anions for the metal salts may be different from each other. Next, a basic aqueous solution with a pH of 11 to 14 is added to the aqueous solution and stirred such that hydroxides including the metal elements are precipitated by the liquid phase reaction in the aqueous solution. Accordingly, a sol-like raw material hydroxide (precursor) is obtained. As the basic aqueous solution, for example, a sodium hydroxide solution or ammonia water may be used.

Next, the raw material hydroxide is mixed with a lithium supply source and a fluorine supply source, and the mixture is baked in an oxidizing atmosphere under appropriate conditions and is thereafter cooled. As the lithium supply source, Li or a compound containing Li, for example, lithium carbonate, lithium hydroxide, lithium nitrate, and lithium acetate may be used. The amount of the mixed lithium supply source is not particularly limited. However, in order to allow the spinel crystal phase and the layered crystal phase as the second oxide phase to be present while being mixed with each other, for example, Li may be adjusted to 1.1 mol or higher (typically, about 1.1 mol to 1.3 mol, for example, about 1.2 mol) when the sum of the metal elements in the raw material hydroxide is 2 mol so that Li is rich. As the fluorine supply source, an $F_2$ gas or a compound containing F, for example, lithium fluoride and ammonium fluoride may be used. The amount of the mixed fluorine supply source is not particularly limited, and may be 0.01 mol % to 0.5 mol % (for example, 0.02 mol % to 0.3 mol %) with respect to the entirety (100 mol %) of the raw material hydroxide. By controlling the amount of the mixed fluorine supply source, the fluorine atom concentration (typically the amount of fluorine substituted with oxygen) can be controlled.

Here, baking is performed in multiple stages by changing the baking temperature during the baking. Accordingly, the F—NiMn oxide particle in which the fluorine atom concentration varies between the center portion and the crystal phase of the particle can be obtained. For example, the baking may be performed in two stages in which holding for several to tens of hours at about 700° C. to 900° C. is performed and thereafter holding for tens of minutes to several hours at about 900° C. to 1000° C. is further performed. By initially performing holding for a sufficiently long period of time at a relatively low temperature, fluorine can be sufficiently diffused to the center portion of the particle, and fluorine can be homogeneously contained in the particle. Thereafter, baking is performed for a relatively short time at an increased baking temperature such that the surface layer portion of the particle selectively contains fluorine. Accordingly, the fluorine atom concentration of the surface layer portion can be increased. As a result, the F—NiMn oxide particle in which the fluorine atom concentration of the particle center portion is light and the fluorine atom concentration of the surface layer portion is dense can be obtained. That is, by controlling the baking conditions (baking temperature and backing time), the fluorine atom concentrations of the particle center portion and the surface layer portion can be respectively controlled to appropriate values.

In addition, as another appropriate aspect, NiMn oxide particles which do not contain fluorine (oxygen is not substituted with fluorine (unsubstituted)) are obtained by purchasing a commercial product, and the particles are exposed to a fluorine-based gas (for example, fluorine gas) under appropriate conditions (for example, an environment with a reduced pressure or an environment at a high temperature). In this method, the surface layer portion of the particle can selectively contain fluorine, and thus the fluorine atom concentration of the surface layer portion can be increased. As a result, an F—NiMn oxide particle in which fluorine is rarely present in the particle center portion and the fluorine atom concentration of the surface layer portion is dense.

The above-described positive active material can be used as a positive active material for a lithium-ion secondary battery. That is, the positive electrode of the lithium-ion secondary battery of the embodiment of the present invention typically includes a positive electrode collector, and a positive active material layer which is formed on the positive electrode collector and contains the positive active material described above. As the positive electrode collector, a conductive member made of a metal having good conductivity (for example, aluminum) may be appropriately employed. In addition, the positive active material layer may contain an arbitrary component such as a conductive material or a binder as necessary in addition to the positive active material. As the conductive material, for example, a carbon material such as carbon black (for example, acetylene black and Ketjen Black) is exemplified. As the binder, for example, polyvinylidene fluoride (PVdF) and polyethylene oxide (PEO) are exemplified.

The positive electrode of the lithium-ion secondary battery of the embodiment of the present invention may have an operating potential (vs.Li/Li$^+$) of 4.5 V or higher (preferably 4.6 V or higher, and more preferably 4.7 V) in a range of an SOC value of 0% to 100%. By allowing the operating potential of the positive electrode to be 4.5 V or higher, the potential difference (voltage) between the positive and negative electrodes can be increased, and thus a high energy density of the battery can be obtained. In general, the operating potential between 0% and 100% of the SOC value is maximized when the SOC value is 100%. Therefore, typically, the operating potential of the positive electrode can be recognized (for example, whether or not the operating potential is 4.5 V or higher) using the operating potential of the positive electrode when the SOC value is 100% (that is, fully charged state).

In addition, the operating potential of the positive electrode in a range of an SOC value of 100%, for example, measurement can be performed as follows. First, a positive electrode as a measurement object is prepared, and a three electrode cell is constructed by using the positive electrode as a working electrode (WE), using metal lithium as a counter electrode (CE), and metal lithium as a reference electrode (RE). Next, the SOC of the three electrode cell is adjusted to 100% on the basis of the theoretical capacity of the three electrode cell. The adjustment of the SOC can be performed by a charging process between the WE and the CE using, for example, a general charging and discharging device or a potentiostat. By measuring the potential between the WE and the RE of the three electrode cell having an adjusted SOC, the potential can be determined as the operating potential (vs.Li/Li$^+$) of the positive electrode in the SOC state.

The lithium-ion secondary battery can be manufactured by using the positive electrode, a negative electrode, and a non-aqueous electrolyte. The negative electrode typically includes, similarly to the positive electrode, a negative electrode collector, and a negative active material layer formed on the negative electrode collector. The negative active material may contain an arbitrary component (for example, a binder or a thickener) in addition to the negative active material. As the negative electrode collector, a conductive material made of a metal having good conductivity (for example, copper) may be appropriately employed. As the negative active material, for example, a carbon material such as graphite may be employed. As the binder, styrene-butadiene rubber (SBR) or the like may be employed. As the thickener, for example, carboxymethyl cellulose (CMC) or the like may be employed. As the non-aqueous electrolyte, an electrolyte containing a support salt in a non-aqueous solution (non-aqueous electrolytic solution) may be appropriately used. As the support salt, for example, $LiPF_6$ and $LiBF_4$ may be employed. As an organic solvent, for example, an aprotic solvent such as carbonates, esters, and ethers may be employed. Among these, a solvent having high oxidation resistance (that is, a high oxidative decomposition potential), for example, a fluorinated cyclic carbonate such as monofluoroethylene carbonate (MFEC) or a fluorinated chain carbonate such as (2,2,2-trifluoroethyl) methyl carbonate (F-DMC) may be appropriately employed.

Although not intended for particular limitation, as an embodiment of the present invention, a lithium-ion secondary battery having a form in which a flat wound electrode assembly and a non-aqueous electrolyte are accommodated in a battery case having a flat rectangular parallelepiped shape is exemplified. In the following drawings, like members and sites having the same actions are denoted by like reference numerals, and an overlapping description may be omitted or simplified. In each of the drawings, the dimensional relationships (length, width, thickness, and the like) do not necessarily reflect actual dimensional relationships.

FIG. 1 is a longitudinal sectional view schematically illustrating the cross-sectional structure of a lithium-ion secondary battery 100. In the lithium-ion secondary battery 100, an electrode assembly (wound electrode assembly) 80 having a form in which a long positive electrode sheet 10 and a long negative electrode sheet 20 are wound in a flat manner via a long separator sheet 40, and a non-aqueous electrolyte are accommodated in a battery case 50 having a flat box shape.

The battery case 50 includes a battery case main body 52 having a flat rectangular parallelepiped shape (box shape) with an open upper end, and a cover 54 which blocks the opening. In the upper surface (that is, the cover 54) of the battery case 50, a positive electrode terminal 70 for external connection, which is electrically connected to the positive electrode of the wound electrode assembly 80, and a negative electrode terminal 72 which is electrically connected to the negative electrode of the wound electrode assembly 80 are provided. Like the battery case of a lithium-ion secondary battery in the related art, the cover 54 is also provided with a safety valve 55 for discharging gas generated in the battery case 50 to the outside of the case 50.

In the battery case 50, the flat wound electrode assembly 80 and the non-aqueous electrolyte (not illustrated) are accommodated. The wound electrode assembly 80 has a long sheet structure in a previous stage during assembly. The positive electrode sheet 10 includes a long positive electrode collector, and a positive active material layer 14 formed on at least one surface (typically both surfaces) of the positive electrode collector along the longitudinal direction thereof. The negative electrode sheet 20 includes a long negative electrode collector, and a negative active material layer 24 formed on at least one surface (typically both surfaces) of the negative electrode collector along the longitudinal direction thereof. In addition, between the positive active material layer 14 and the negative active material layer 24, two long sheet-like separators (separator sheets) 40 are disposed as an insulating layer for preventing direct contact between the two layers. As the separator, a porous resin sheet formed from a resin such as polyethylene (PE) and polypropylene (PP) may be appropriately used.

In a width direction specified as a direction from one end portion of the wound electrode assembly 80 in the winding axis direction thereof to the other end portion thereof, the center portion thereof is provided with a wound core portion formed by overlapping and densely laminating the positive active material layer 14 formed on the surface of the positive electrode collector and the negative active material layer 24 formed on the surface of the negative electrode collector. In addition, in both end portions of the wound electrode assembly 80 in the winding axis direction thereof, a positive active material layer non-formation portion of the positive electrode sheet 10 and a negative active material layer non-formation portion of the negative electrode sheet 20 protrude outward from the wound core portion. In addition, a positive electrode collector plate is attached to a positive electrode side protrusion portion (the positive active material layer non-formation portion), and a negative electrode collector plate is attached to a negative electrode side protrusion portion (the negative active material layer non-formation portion) to be electrically connected to the above-mentioned positive electrode terminal 70 and the negative electrode terminal 72, respectively.

The lithium-ion secondary battery manufactured according to the manufacturing method of the embodiment of the present invention can be used for various applications and also exhibits a high energy density, excellent input and output characteristics, and high durability. Therefore, by emphasizing the characteristics, the lithium-ion secondary battery can be preferably used for an application that requires a high energy density, a high input and output density, and high durability, or an application in which the use environment is at a high temperature of 50° C. or higher. Examples of the applications include a power source for a motor mounted in a vehicle (drive power source). The type of the vehicle is not particularly limited, and typically, a vehicle, for example, a plug-in hybrid vehicle (PHV), a hybrid vehicle (HV), an electric vehicle (EV), and the like may be employed. The lithium-ion secondary battery may be typically used in a battery pack form in which a plurality of lithium-ion secondary batteries are connected in series and/or in parallel.

Hereinafter, several examples regarding the present invention will be described. However, it is not intended to limit the present invention to the examples.

The production of a positive active material $LiNi_{0.5}Mn_{1.5}O_{3.98}F_{0.02}$—$Li_2MnO_{2.99}F_{0.01}$ of Comparative Example 1 will be described below. First, nickel sulfate ($NiSO_4$) and manganese sulfate ($MnSO_4$) were dissolved in water to achieve the above composition, and sodium hydroxide (NaOH) was added thereto and stirred while being neutralized, thereby obtaining a raw material hydroxide according to Comparative Example 1. The raw material hydroxide was mixed with lithium carbonate ($Li_2CO_3$) and 0.02 mol % of lithium fluoride (LiF) with respect to the entirety (100 mol %) of the raw material hydroxide, and the mixture was baked at 900° C. in an air atmosphere for 15 hours and was crushed by a ball mill, thereby obtaining a fluorine-containing lithium nickel manganese composite oxide having an average particle diameter of 5 μm. In addition, the X-ray diffraction profile of a primary particle included in the composite oxide was analyzed on the basis of the Rietveld method. As a result, it was confirmed that a first phase (primary phase) made of $LiNi_{0.5}Mn_{1.5}O_{3.98}F_{0.02}$, and a second phase which had a layered crystal structure and was made of $Li_2MnO_{2.99}F_{0.01}$ were included. In addition, it was confirmed that the molar ratio of the phases (the first phase: the second phase) was 0.95:0.05 (that is, when the total amount of the positive active material was 100 mol %, the ratio of $Li_2MnO_{2.99}F_{0.01}$ was 5 mol %).

The production of a positive active material $LiNi_{0.5}Mn_{1.5}O_{3.95}F_{0.05}$—$Li_2MnO_{2.96}F_{0.04}$ of Comparative Example 2 will be described below. In Comparative Example 2, a fluorine-containing lithium nickel manganese composite oxide having an average particle diameter of 5 μm was obtained in the same manner as that of Comparative Example 1 except that 0.1 mol % of lithium fluoride (LiF) with respect to the entirety (100 mol %) of the raw material hydroxide was added during baking.

The production of a positive active material $LiNi_{0.5}Mn_{1.5}O_{3.9}F_{0.1}$—$Li_2MnO_{2.93}F_{0.07}$ of Comparative Example 3 will be described below. In Comparative Example 3, a fluorine-containing lithium nickel manganese composite oxide having an average particle diameter of 5 μm was obtained in the same manner as that of Comparative Example 1 except that 0.3 mol % of lithium fluoride (LiF) with respect to the entirety (100 mol %) of the raw material hydroxide was added during baking.

The production of a positive active material $LiNi_{0.5}Mn_{1.5}O_{3.95}F_{0.05}$—$Li_2MnO_{2.96}F_{0.04}$ of Example 1 will be described below. First, nickel sulfate ($NiSO_4$) and manganese sulfate ($MnSO_4$) were dissolved in water to achieve the above composition, and sodium hydroxide (NaOH) was added thereto and stirred while being neutralized, thereby obtaining a raw material hydroxide according to Example 1. The resultant was mixed with a predetermined amount of lithium carbonate ($Li_2CO_3$), and the mixture was baked at 900° C. in an air atmosphere for 15 hours and was crushed by a ball mill, thereby obtaining a lithium nickel manganese composite oxide ($LiNi_{0.5}Mn_{1.5}O_4$—$Li_2MnO_3$)

having an average particle diameter of 5 μm (fluorine was not contained). The composite oxide was exposed to an $F_2$ gas atmosphere in a sealed container under an environment at 25° C., thereby obtaining a fluorine-containing lithium nickel manganese composite oxide.

The production of a positive active material $LiNi_{0.5}Mn_{1.5}O_{3.95}F_{0.05}$—$Li_2MnO_{2.96}F_{0.04}$ of Example 2 will be described below. A fluorine-containing lithium nickel manganese composite oxide having an average particle diameter of 5 μm was obtained in the same manner as that of Comparative Example 2 except that the raw material hydroxide was mixed with a predetermined amount of lithium carbonate ($Li_2CO_3$) and lithium fluoride (LiF) and baking was performed in two stages in which the mixture was held at 900° C. in an air atmosphere for 15 hours and was thereafter held at 930° C. for 30 minutes.

The production of a positive active material $LiNi_{0.45}Fe_{0.05}Mn_{1.45}Ti_{0.05}O_{3.95}F_{0.05}$—$Li_2MnO_{2.96}F_{0.04}$ of Comparative Example 4 will be described below. A fluorine-containing lithium nickel iron manganese titanium composite oxide having an average particle diameter of 5 μm was obtained in the same manner as that of Comparative Example 2 except that the nickel sulfate ($NiSO_4$), iron sulfate ($FeSO_4$), manganese sulfate ($MnSO_4$), and titanium sulfate ($TiSO_4$) were dissolved in water to achieve the above composition, and sodium hydroxide (NaOH) was added thereto and stirred while being neutralized to obtain a raw material hydroxide.

The production of a positive active material $LiNi_{0.45}Fe_{0.05}Mn_{1.45}Ti_{0.05}O_{3.95}F_{0.05}$—$Li_2MnO_{2.96}F_{0.04}$ of Example 3 will be described below. A fluorine-containing lithium nickel iron manganese titanium composite oxide having an average particle diameter of 5 μm was obtained in the same manner as that of Example 2 except that the nickel sulfate ($NiSO_4$), iron sulfate ($FeSO_4$), manganese sulfate ($MnSO_4$), and titanium sulfate ($TiSO_4$) were dissolved in water to achieve the above composition, and sodium hydroxide (NaOH) was added thereto and stirred while being neutralized to obtain a raw material hydroxide. The properties of the positive active materials are collected in Table 1 below.

Figure 2:
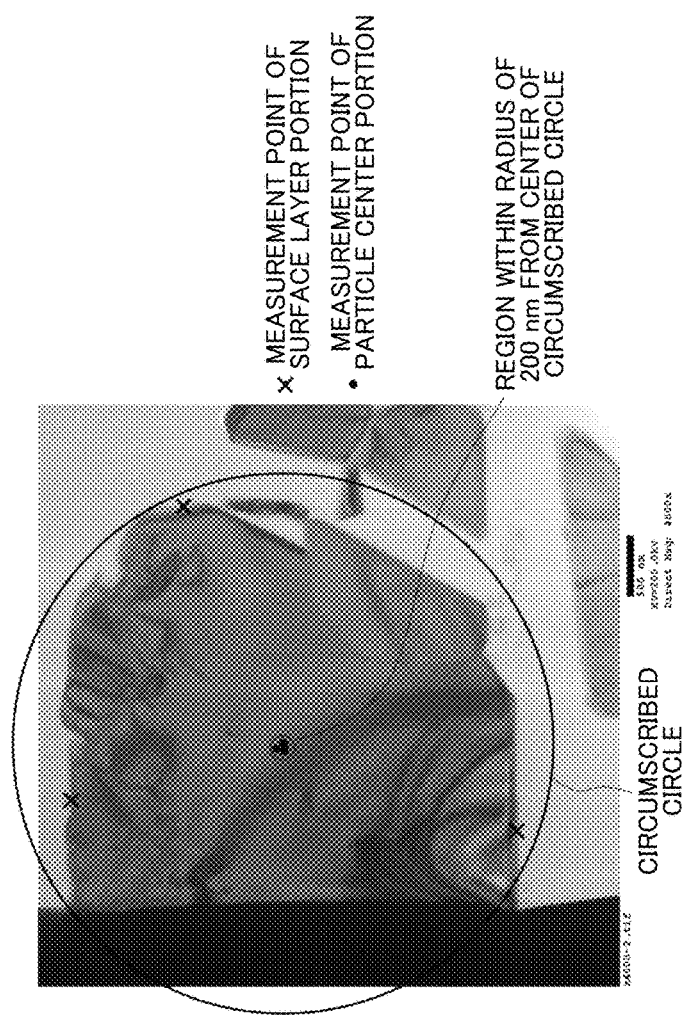
FIG. 2 is a TEM observation image according to Example 1, in which cross marks (x) indicate EDX measurement points of a surface layer portion, and circles (O) indicate EDX measurement points of a particle center portion.

Hereinafter, the distribution of the fluorine atom concentration will be described. The obtained composite oxide particle was subjected to embedding and polishing to expose the cross-section of the particle, and the cross-section was observed with a transmission electron microscope (TEM). For the obtained TEM observation image, the fluorine atom concentrations (at %) at the particle center portion and the surface layer portion were obtained using energy dispersive X-ray spectroscopy (EDX). As an example, in FIG. 2, a TEM observation image of Example 1 is illustrated. Measurement of the particle center portion was performed on three points indicated by circles (O) in FIG. 2. Specifically, the smallest circle that circumscribes the particle was drawn on the cross-sectional TEM observation image of the particle, and arbitrary three points were selected from a portion of the spinel crystal phase in a region within 200 nm from the center thereof (a region within a radius of 200 nm from the center of the circumscribed circle) and were subjected to line analysis. An arithmetic average of the obtained results was obtained and determined as the fluorine atom concentration Fc (at %) of the particle center portion. In addition, measurement of the surface layer portion was performed on three points indicated by cross marks (x) in FIG. 2. Specifically, arbitrary three points were selected from a portion of the spinel crystal phase in a region within 20 nm from the outermost surface of the particle toward the center thereof on the cross-sectional TEM observation image of the particle and were subjected to line analysis. An arithmetic average of the obtained results was obtained and determined as the fluorine atom concentration Fs (at %) of the surface layer portion. In addition, the portion of the spinel crystal phase is distinguished from portions made of other crystal phases (for example, the layered crystal phase) by, for example, gray scale of the TEM observation image or electron beam diffraction and thus can be recognized. The fluorine atom concentrations (at %) of the center portion and the outermost surface portion of the particle according to each of the examples are shown in Table 1.

TABLE 1

| Experimental Examples | | Composition | Molar ratio | Fluorine atom concentration (atm %) | | Distribution | High-temperature cycle test (60° C., 2 C.) | | Amount of generated gas (relative value) | Internal DC resistance (relative value) |
|---|---|---|---|---|---|---|---|---|---|---|
| | | | | Surface layer portion Fs | Particle center portion Fc | | Deterioration capacity (relative value) | | | |
| | | | | | | | Initial period 30 cyc. | Latter period 200 cyc. | | |
| Comparative Example 1 | First phase | $LiNi_{0.5}Mn_{1.5}O_{3.98}F_{0.02}$ | 95 mol % | 6 | 6 | Absent | 25 | 100 | 100 | 100 |
| | Second phase | $Li_2MnO_{2.99}F_{0.01}$ | 5 mol % | | | | | | | |
| Comparative Example 2 | First phase | $LiNi_{0.5}Mn_{1.5}O_{3.95}F_{0.05}$ | 95 mol % | 10 | 10 | Absent | 22 | 84 | 85 | 103 |
| | Second phase | $Li_2MnO_{2.96}F_{0.04}$ | 5 mol % | | | | | | | |
| Comparative Example 3 | First phase | $LiNi_{0.5}Mn_{1.5}O_{3.9}F_{0.1}$ | 95 mol % | 30 | 30 | Absent | 19 | 76 | 75 | 122 |
| | Second phase | $Li_2MnO_{2.93}F_{0.07}$ | 5 mol % | | | | | | | |
| Example 1 | First phase | $LiNi_{0.5}Mn_{1.5}O_{3.95}F_{0.05}$ | 95 mol % | 30 | 0 | Present | 19 | 81 | 77 | 101 |
| | Second phase | $Li_2MnO_{2.96}F_{0.04}$ | 5 mol % | | | | | | | |

TABLE 1-continued

| Experimental Examples | Specification of positive active material | | Molar ratio | Fluorine atom concentration (atm %) | | | High-temperature cycle test (60° C., 2 C.) | | | |
|---|---|---|---|---|---|---|---|---|---|---|
| | | | | Surface layer portion Fs | Particle center portion Fc | Distribution | Deterioration capacity (relative value) | | Amount of generated gas (relative value) | Internal DC resistance (relative value) |
| | | Composition | | | | | Initial period 30 cyc. | Latter period 200 cyc. | | |
| Example 2 | First phase | LiNi$_{0.5}$Mn$_{1.5}$O$_{3.95}$F$_{0.05}$ | 95 mol % | 30 | 10 | Present | 19 | 78 | 76 | 103 |
| | Second phase | Li$_2$MnO$_{2.96}$F$_{0.04}$ | 5 mol % | | | | | | | |
| Comparative Example 4 | First phase | LiNi$_{0.45}$Fe$_{0.05}$Mn$_{1.45}$Ti$_{0.05}$O$_{3.95}$F$_{0.05}$ | 95 mol % | 10 | 10 | Absent | 11 | 48 | 53 | 87 |
| | Second phase | Li$_2$MnO$_{2.96}$F$_{0.04}$ | 5 mol % | | | | | | | |
| Example 3 | First phase | LiNi$_{0.45}$Fe$_{0.05}$Mn$_{1.45}$Ti$_{0.05}$O$_{3.95}$F$_{0.05}$ | 95 mol % | 30 | 10 | Present | 8 | 33 | 35 | 85 |
| | Second phase | Li$_2$MnO$_{2.96}$F$_{0.04}$ | 5 mol % | | | | | | | |

As shown in Table 1, in Comparative Examples 1 to 4, the fluorine atom concentration in the particle was substantially homogeneous. It is thought that this is because fluorine could be homogeneously dispersed to the center portion of the particle by holding the composite oxide at a constant baking temperature for a sufficiently long period of time. In Example 1, since the composite oxide that did not contain fluorine was used, fluorine was rarely present in the particle center portion, and fluorine was present only in the surface layer portion (outermost surface) of the particle. In Examples 2 and 3, the fluorine atom concentration of the particle center portion was light, and the fluorine atom concentration of the surface layer portion was dense. That is, baking was performed in two stages in which holding was performed at a first stage at a holding temperature for a relatively long period of time and thereafter holding was performed at a second stage at a higher holding temperature than that of the first stage for a relatively short time. Accordingly, the fluorine atom concentration in the particle was inclined.

Hereinafter, the production of the positive electrode sheet will be described. The positive active material produced above, acetylene black as a conductive material, and polyvinylidene fluoride (PVdF) as a binder were weighed to achieve a material mass ratio of 87:10:3, and were mixed in N-Methyl-2-pyrrolidone (NMP), thereby preparing a slurry-like composition for forming a positive active material layer. The composition was applied to an aluminum foil (positive electrode collector) having a thickness of 15 μm and was dried and pressed, thereby producing a positive electrode sheet (Comparative Examples 1 to 4 and Examples 1 to 3) in which the positive active material layer was formed on the positive electrode collector.

Hereinafter, the production of the negative electrode sheet will be described. A natural graphite material (with an average particle diameter of 20 μm) as the negative active material, a styrene-butadiene copolymer (SBR) as a binder, and carboxymethyl cellulose (CMC) as a thickener were weighed to achieve a material mass ratio of 98:1:1, and were mixed in water, thereby preparing a slurry-like composition for forming a negative active material layer. The composition was applied to a copper foil (negative electrode collector) having a thickness of 10 μm and was dried and pressed, thereby producing a negative electrode sheet in which the negative active material layer was formed on the negative electrode collector.

Hereinafter, the production of the lithium-ion secondary battery will be described. As the non-aqueous electrolyte, an electrolyte obtained by dissolving LiPF$_6$ as a support salt at a concentration of 1.0 mol/L in a mixed solvent containing monofluoroethylene carbonate (MFEC) as a fluorinated cyclic carbonate and (2,2,2-trifluoroethyl)methyl carbonate (F-DMC) as a fluorinated chain carbonate at a volume ratio of MFEC:F-DMC=50:50 was prepared. The positive electrode sheet and the negative electrode sheet produced as described above were faced opposite to each other with a separator sheet (here, a composite porous sheet in which polypropylene layers were laminated on both sides of a polyethylene layer was used) interposed therebetween, thereby producing an electrode assembly. The electrode assembly and the non-aqueous electrolyte were accommodated in a laminate case and were sealed, thereby producing a lithium-ion secondary battery (laminate cell).

Hereinafter, an activation process and the measurement of an initial capacity will be described. The lithium-ion secondary battery produced as described above was charged with a constant current (CC) at a rate of 1/5 C in an environment at a temperature of 25° C. until the voltage reaches 4.9 V, and thereafter constant voltage (CV) charging was performed until the current value reaches 1/50C. This state was specified as a fully charged state (SOC100%). Thereafter, constant current (CC) discharging was performed at a rate of 1/5 C in an environment at a temperature of 25° C. until the voltage reaches 3.5 V. The CC discharge capacity at this time was specified as an initial capacity. Here, 1 C means a current value with which a battery capacity (Ah) predicted from the theoretical capacity of the positive electrode can be charged within one hour.

Hereinafter, the measurement of DC resistance will be described. Each lithium-ion secondary battery was subjected to CC charging at a rate of 1/5 C in an environment at a temperature of 25° C. until the SOC reaches 50% when the initial capacity is specified as 100%. A discharge pulse current was applied to the battery that was adjusted to an SOC 50% state, at a rate of 5 C for ten seconds. In addition, a voltage drop value (V) for ten seconds was divided by the corresponding current value (V), thereby calculating an internal DC resistance. The results are shown in the "internal DC resistance" row in Table 1. In Table 1, relative values are shown when the internal DC resistance of the lithium-ion secondary battery according to Comparative Example 1 is specified as the reference (100).

Hereinafter, a high-temperature cycle test will be described. Charging and discharging of each lithium-ion secondary battery were repeated in 200 cycles under a temperature condition of 60° C., and thereafter the battery capacity (CC discharge capacity) after each cycle was measured in the same manner as the initial capacity measurement. In addition, as for charging and discharging conditions for one cycle during the high-temperature cycle test, after CC charging was performed at a charging rate of 2 C until the voltage reaches 4.9 V, CC discharging was performed at a discharging rate of 2 C until the voltage reaches 3.5 V. In addition, the battery capacity after N cycles was subtracted from the initial capacity, thereby obtaining a deterioration capacity after each cycle. As a representative value, results after 30 cycles in the initial period of the charging and discharging cycles, and results after 200 cycles in the latter period of the charging and discharging cycles are shown in the corresponding rows of Table 1. In addition, in Table 1, relative values are shown when the deterioration capacity of the lithium-ion secondary battery according to Comparative Example 1 is specified as the reference (100).

The evaluation of the amount of generated gas was performed by using the Archimedes method. That is, first, the lithium-ion secondary battery immediately after being produced was immersed in a container filled with a fluorine-based inert liquid (Fluorinert (trademark) made by Sumitomo 3M. Limited), and the initial volume was measured from a change in weight before and after the immersion. Furthermore, the volume was measured in the same method after the high-temperature cycle test, and a value obtained by subtracting the initial volume from the volume after the cycle test was calculated as the amount of generated gas. The results are shown in the corresponding rows of Table 1. In addition, in Table 1, relative values are shown when the amount of gas generated in the lithium-ion secondary battery according to Comparative Example 1 is specified as the reference (100).

As shown in Table 1, in Comparative Examples 1 to 3 in which the fluorine atom concentration in the composite oxide particle is substantially homogeneous, the deterioration capacity and the amount of generated gas after the high-temperature cycle test were reduced as the amount of added fluorine is increased. The reduction in the deterioration capacity is an effect caused by a situation in which bond between the transition metals (particularly Mn) that are easily eluted as the amount of added fluorine is increased and fluorine (F) becomes stronger and thus the elution of the transition metals is suppressed. In addition, the reduction in the amount of generated gas is an effect caused by a situation in which fluorine compensates for oxygen-deficient portions of the surface of the particle which act as the origin of gas generation (decomposition of the non-aqueous electrolyte) as the amount of added fluorine is increased are compensated, to a high degree. On the other hand, the internal DC resistance value was substantially the same in Comparative Examples 1 and 2 in which the amount of added fluorine was relatively small and was significantly increased in Comparative Example 3 in which the amount of added fluorine was relatively large. It is estimated that the increase in the resistance is a result caused by a situation in which the interaction between fluorine that was present in the particle and the charge carriers (lithium) was increased as the amount of added fluorine is increased and thus the diffusibility (mobility) of lithium in the particle was degraded.

In Example 1, the internal DC resistance was suppressed at an equal level to that of Comparative Examples 1 and 2. It is thought that this is because fluorine was rarely present in the particle center portion and thus the diffusibility (mobility) of lithium in the particle was ensured. In addition, the deterioration capacity and the amount of generated gas were suppressed to a low level between Comparative Examples 2 and 3. It is thought that this is because the fluorine atom concentration of the surface layer portion of the particle in Example 1 was dense (the oxygen deficiency amount of the particle surface was small). As described above, it was seen that in Example 1, the suppression of capacity deterioration and gas generation after high-temperature cycles and a reduction in resistance can be compatible with each other.

In addition, in Example 2 in which the fluorine atom concentration of the particle center portion was light and the fluorine atom concentration of the surface layer portion was dense, the internal DC resistance was suppressed to a low level similarly to Example 1. Moreover, the deterioration capacity and the amount of generated gas were further reduced than those of Example 1 and were equal to that in Comparative Example 3 in which the amount of added fluorine was large. As described above, it was seen that in Example 2, capacity deterioration and gas generation could be further suppressed while maintaining a low resistance. Particularly in Example 2, the deterioration capacity in the latter period of the charging and discharging cycles (after 200 cycles) was improved compared to Example 1. It is thought that this is because the elution of the transition metals in the latter period of the charging and discharging cycles could be suppressed by including fluorine in the particle center portion. That is, it could be seen that since fluorine was present in the particle (here, the particle center portion) in a low proportion (for example, 10 at % or higher), capacity deterioration in the latter period of the charging and discharging cycles could be suppressed.

In addition, in Example 3 in which a portion of Mn and Ni was substituted with Fe and Ti, the deterioration capacity, the amount of generated gas, and the internal DC resistance were further reduced than those of Example 2. It is thought that this is an effect caused by a situation in which, when fluorine was contained in the composite oxide particle, the average valence of manganese was increased from +3 to +4 in order to maintain the charge balance and thus the ratio of stable $Mn^{4+}$ was increased, or fluorine compensated for oxygen-deficient portions and thus the oxygen deficiency amount was reduced. As described above, by using the positive active material of Examples of the present invention, a lithium-ion secondary battery having both high durability (for example, high-temperature high-rate cycle characteristics) and excellent input and output characteristics can be obtained.

While the present invention has been described in detail, the embodiments and Examples are merely examples, and various modifications and changes of the specific examples described above are included in the present invention.

What is claimed is:

1. A positive active material for a lithium-ion secondary battery, the positive active material comprising:
    a lithium composite oxide particle represented by the following general formula (I):

$$Li_x(Mn_{2-(a+b+c+d)}Ni_aTi_bFe_cM_d)(O_{4-y}F_y) \quad (I)$$

wherein
    $0.4 < a < 0.5$,
    $0.01 \leq b < 0.2$,
    $0.01 \leq c < 0.1$,
    $0 \leq d < 0.2$,
    $0.9 < x < 1.3$,
    $0.05 \leq y \leq 0.2$, and
    when $0 < d$ is satisfied, M is at least one element selected from the group consisting of aluminum, magnesium, calcium, barium, strontium, scandium, vanadium, chromium, cobalt, copper, zinc, gallium, yttrium, ruthenium, rhodium, lead, indium, tin, antimony, lanthanum, cerium, samarium, zirconium, niobium, tantalum, molybdenum, and tungsten,
    the lithium composite oxide particle contains a spinel crystal phase as a first oxide phase and a layered crystal phase as a second oxide phase,
    the lithium composite oxide particle includes a particle center portion and a surface layer portion that is closer to a surface of the lithium composite oxide particle than the particle center portion is, and
    a fluorine atom concentration Fc (at %) of the particle center portion measured by energy dispersive X-ray spectroscopy is lower than a fluorine atom concentration Fs (at %) of the surface layer portion.

2. The positive active material according to claim 1, wherein
    a portion of oxygen atoms in the lithium composite oxide particle is substituted with the fluorine atoms.

3. The positive active material according to claim 2, wherein
    the fluorine atoms are present in the particle center portion in a proportion of 10 at % or lower.

4. The positive active material according to claim 1, wherein
    the Fc is 0 at % or higher and 10 at % or lower.

5. The positive active material according to claim 1, wherein
    the Fs is 30 at % or higher.

6. The positive active material according to claim 1, wherein
    a difference obtained by subtracting the Fc from the Fs is 20 at % or greater.

7. The positive active material according to claim 1, wherein
    at least one of a portion of the nickel atoms or a portion of the manganese atoms is substituted with iron atoms, and
    at least one of a portion of the nickel atoms or a portion of the manganese atoms is substituted with titanium atoms.

8. The positive active material according to claim 1, wherein
    the particle center portion is a region extending, toward a center of the lithium composite oxide particle, from a position of 100 nm or greater inward from the surface of the lithium composite oxide particle.

9. The positive active material according to claim 8, wherein
    the surface layer portion is a region of 20 nm or smaller from the surface toward the center.

10. The positive active material according to claim 1, wherein
    the particle center portion is a portion of the lithium composite oxide particle containing no fluorine atoms and extending from a center of the lithium composite oxide particle toward the surface of the lithium composite oxide particle, and
    the surface layer portion is a portion of the lithium composite oxide particle containing the fluorine atoms and extending from the surface toward the center.

11. A positive electrode for a lithium-ion secondary battery, the positive electrode comprising
    the positive active material according to claim 1.

12. A lithium-ion secondary battery comprising
    the positive electrode according to claim 11.

* * * * *